Aug. 14, 1956
C. LOVELESS
2,758,875
COMBINED CENTER COLUMN AND DISTRIBUTOR
FOR SEWAGE TREATING APPARATUS
Filed July 6, 1953
2 Sheets-Sheet 1
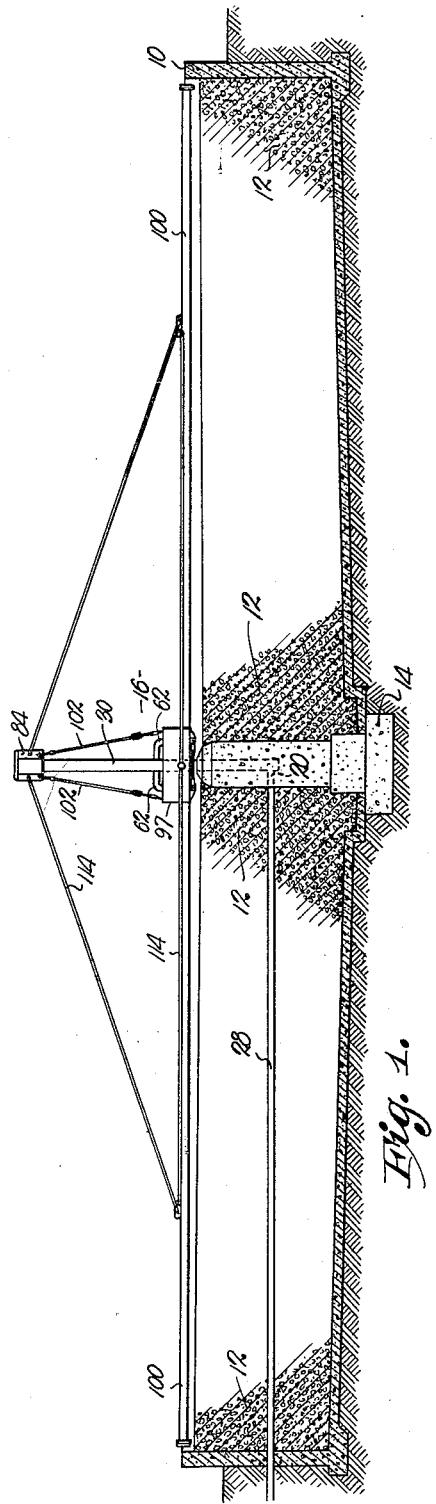
Fig. 1.
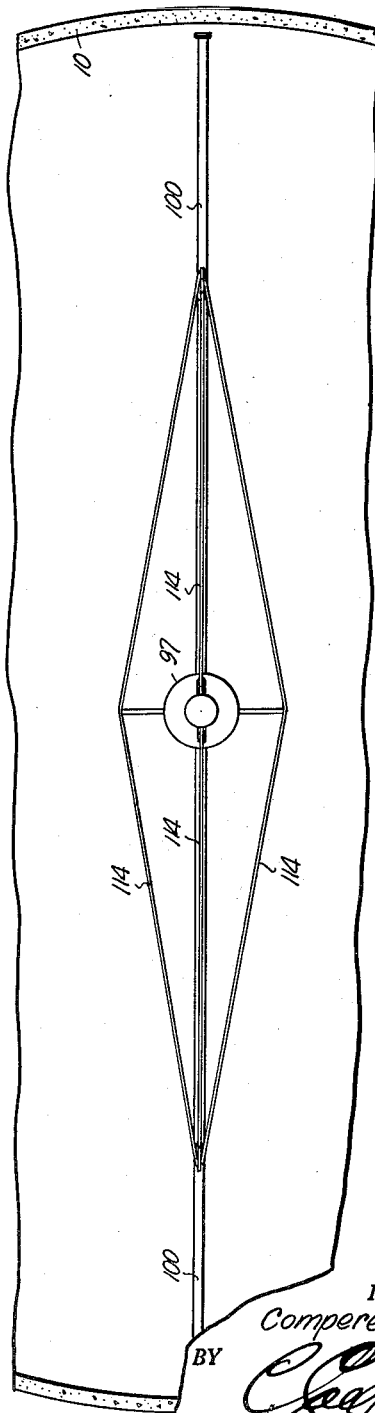
Fig. 2.
INVENTOR.
Compere Loveless
BY
ATTORNEY.

United States Patent Office 2,758,875
Patented Aug. 14, 1956

2,758,875

COMBINED CENTER COLUMN AND DISTRIBUTOR FOR SEWAGE TREATING APPARATUS

Compere Loveless, Prairie Village, Kans.

Application July 6, 1953, Serial No. 366,086

1 Claim. (Cl. 299—69)

This invention relates to the field of sewage purification wherein is employed the trickling filter method of secondary treatment of sewage, and relates particularly to the center column arrangement for the reaction type rotary distributor that forms a part of the apparatus used in treating sewage by this method.

The most important object of this invention is to provide a center column for rotary distributors which is made without seals of any kind between the bottom of the rotating mechanism and the stationary part of the center column, and which is, therefore, not subject to breakdowns caused by the blowing of such seals under pressure.

Another important object of the present invention is the provision of a center column assembly for sewage treating apparatus of the aforementioned character wherein is embodied a hollow, stationary, vertical column with radial branches extending into a specially formed sump which in turn is in communication with and forms a part of the arms of the rotary distributor, all to the end that sewage fed through the column may flow to the arms as the latter are rotating. At the same time, the problems of excessive friction and of maintaining a seal, such as now present themselves in center column assemblies, are overcome.

Other important objects of the invention include the specific manner of rotatably mounting the sump and distributor arms by suspending them from the center column of the assembly and by providing antifriction elements between the rotating mechanism and the stationary center column.

In accomplishing these and further objects of the present invention, I have provided improved details of structure, the preferred form of which is illustrated in the accompanying drawings, wherein:

Figure 1 is a vertical cross sectional view through the trickling filter of a secondary sewage treating system having a rotary distributor, the latter being shown in elevation, and provided with a center column assembly made in accordance with the present invention.

Fig. 2 is a fragmentary top plan view of the trickling filter and rotary distributor shown in Fig. 1.

Figure 3:
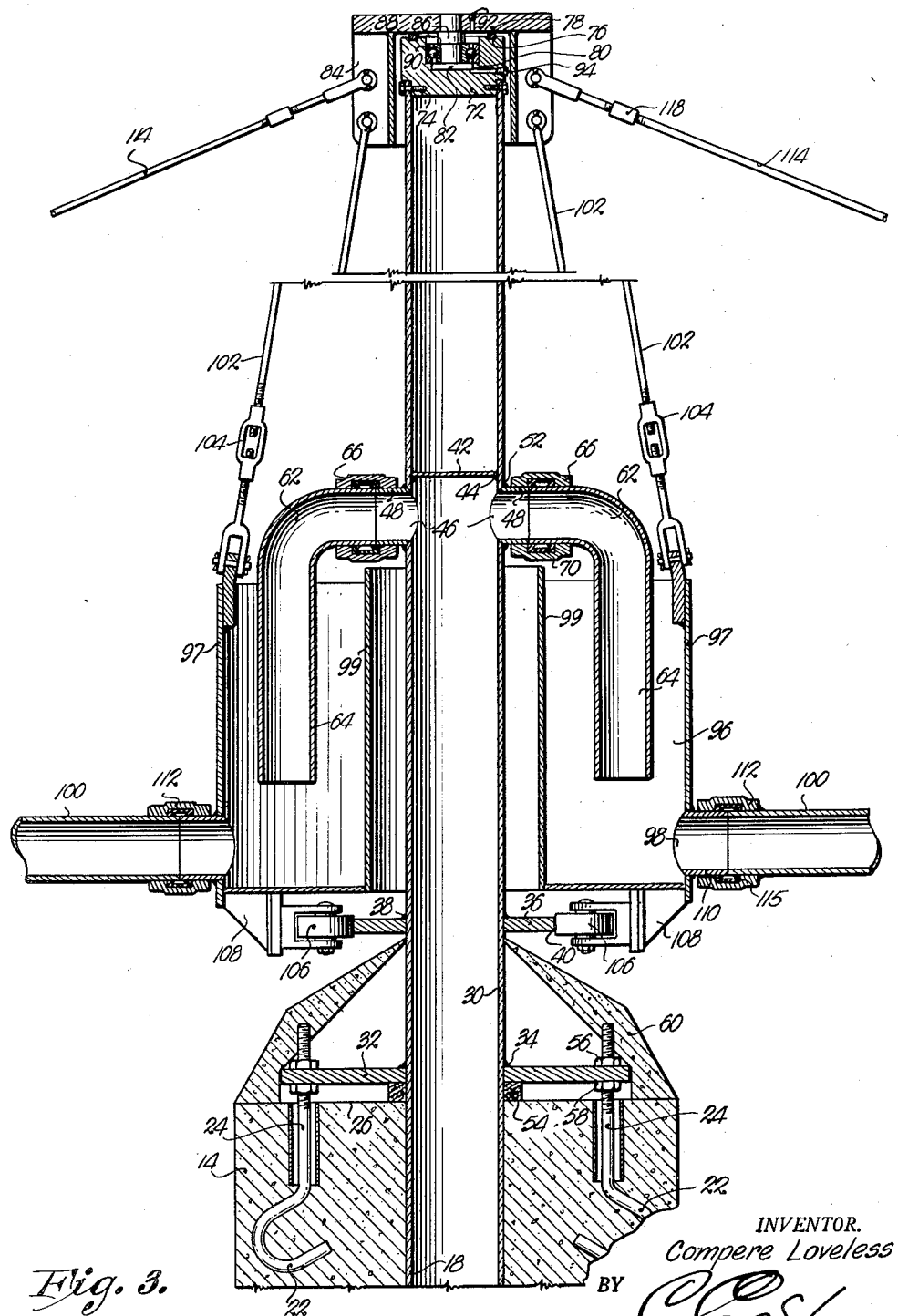
Fig. 3 is an enlarged, fragmentary vertical central sectional view through the center column assembly of Fig. 1, illustrating in detail the preferred embodiment of the present invention.

The trickling filter method of sewage purification has come into wide usage as a method of secondary treatment. Two types of trickling filters are known in the sanitary field, namely the rectangular bed type with fixed nozzles, and the rotating distributor type with one or more arms motivated by the reaction of the arms to the flow of sewage through nozzles spaced along each arm. In effect, the rotary distributor type has superseded the less efficient fixed nozzle type.

Center columns currently in use with the rotary distributors of trickling filter systems consist of a stationary inner column and a rotating outer column. Sewage enters the inner column and passes through the outer column to distributor arms which spread the sewage uniformly over the filter. To prevent leakage between the two columns in such a closed system, it has been necessary to provide a seal, of mercury, oil, grease or the like, which seals either leak or blow completely when an excessive pressure builds up in the system. Furthermore, with this type of construction it has been necessary to provide large thrust bearings and elongated guide bearings between the two columns, for the purpose of maintaining the entire system, including the distributor arms, in alignment.

The invention disclosed herein eliminates the need for both the seals and elongated guide bearings, and thus insures more reliable operation under adverse conditions, and especially under conditions of varying pressure. Exact alignment between the stationary and rotating elements is not required and is, therefore, no longer a problem.

In the drawings, there is illustrated a circular filter bed 10, filled with rocks or other filtering material 12. A base 14 of cement, or the like, is situated in the center of the filter bed 10, as a support for the rotary distributor indicated generally by the numeral 16.

The base 14 is poured with pipe sections 18 and 20 in place and joined, and with the hooked anchors 22 preset. The anchors 22 have upstanding threaded legs 24 extending above the upper edge 26 of the base 14. The feed pipe 28 leads from an automatic dosing syphon or direct pump type feed (not shown), and is joined to pipe section 20 to provide a passage for sewage to be treated.

Prior to installation, the stationary center column 30, of substantially the same inside and outside diameter as pipe section 18, is fitted with a circular thrust plate 32 at its lowermost end. Plate 32 is attached to column 30 by welding 34, or the like, is substantially perpendicular to the axis of column 30, and has a series of holes bored near its periphery for receiving the legs 24. The circular guide plate 36 is likewise attached to the column 30 by welding, as at 38, and provides a bearing surface 40. The closure plate 42 is welded to the interior of column 30 as at 44. Below closure plate 42, column 30 is provided with one or more openings 46, and a pipe section 48 is welded to column 30 over each opening 46, as at 52.

A packing ring 54, of jute or oakum, or the like, fits around pipe section 18 at its uppermost end, and receives plate 32 when column 30 is placed thereon. Each leg 24 receives a pair of nuts 56 and 58, which are adjusted until column 30 is in a substantially vertical position. At the same time a watertight joint is made, by virtue of packing ring 54. A protective covering 60 is then poured into place.

Elbow joints 62, having extended legs 64, are attached to sections 48 respectively by flexible couplings 66, and sections 48 and 62 combine to form L-shaped tubular branches. Sleeves 66 contain rubber packing rings 70.

The uppermost end of column 30 is fitted with a closure plug 72 secured to the column 30 by a series of screws 74. Plug 72 is provided with an annular groove 76, into which an annular sealing ring 78 is placed. The plug 72 is bored and counterbored to present an annular shoulder 80 and a reservoir 82.

An elongated support 84, in the nature of an inverted cup, has a centrally located and vertical extension 86 which is reduced in diameter at its outermost end to provide shoulder 88. The reduced portion of extension 86 carries a ball race 90, which in turn rests on shoulder 80 when support 84 is in place, as is shown in Fig. 3. A lubrication access in support 84 is indicated at 92, and a drain at 94. The sealing ring 78 prevents the escape of lubricant from the area of the ball race 90.

A circular sump 96 surrounds column 30, and has an inner diameter substantially greater than the outer diameter of the column so that, in installation, the sump 96 clears pipe sections 48. The legs 64, extend into the sump, and there is a hole 98 for each distributor arm 100. As is shown in Fig. 3, the sump 96 is suspended from the support 84 by cables or tie-rods 102, provided with turnbuckles 104. A series of brackets 108 depend from the bottom of sump 96 and carry rollers 106 which bear against surface 40 of plate 36. By adjustment of turnbuckles 104 until rollers 106 bear against surface 40, the upright positioning of sump 96 is assured.

Each hole 98 receives a pipe section 110, each of which receives a distributor arm 100. A flexible coupling 112, provided with a rubber packing ring 115, couples each pipe section 110 with its respective arm 100. Each arm 100 is provided with a series of spaced nozzles (not shown) along the normally trailing edge, which are the outlets for sewage flowing through the system. The outer end of each arm 100 has a removable closure (not shown) to permit the removal of debris which inadvertently enters the system. Each of the arms 100 is additionally supported by cables or tie-rods 114 attached to the outermost ends of arm 100 and to opposite sides of elongated support 84, as is best shown in Figs. 2 and 3. Each of the cables 114 has an internally threaded turnbuckle sleeve 118 for adjusting the arms to a parallel position, or to a position where the outermost ends of the arms 100 are slightly lower than the innermost ends thereof.

In operation, the sewage to be treated enters the column 30 under pressure, and spills over into sump 96, through holes 46 and legs 64. As the sump 96 fills with liquid sewage, a sufficient head is developed therein to charge the conventional nozzles on the distributor arms 100. As the air is blown out of the system, and as the sewage level in the sump rises above the bottom of legs 64, a syphon effect develops to improve the uniformity of flow through the otherwise open system.

The flow of sewage through the nozzles, all of which are located on like edges of the arms 100, causes rotation of the arms 100 and the sump 96 about column 30 by the reaction of the arms 100 to the flow of sewage through the nozzles. If there is an insufficient head in the sump 96, the sewage will not flow, and the sump 96 and arms 100 remain at rest.

When an excessive pressure develops in the column 30, the level of sewage in sump 96 will rise above the normal level, and the system will operate at a slightly increased speed. However, no damage is done, and no repairs are required, as is the case with center columns having seals that blow. It is to be noted that the inner wall 99 of sump 96 is longer than the outer wall 97 thereof, so that an overflow of sewage, under excessive pressure conditions, will spill over the outside wall 97 to the filter, rather than over the inner wall 99. Thus, an unnecessary corrosive action on the center column is avoided.

By providing a guided and suspended sump 96, the need for expensive and finely machined guide bearings is no longer present.

It is thus apparent from the above description that the present invention provides a unique center column construction which is inexpensive and reliable, and which, at the same time, solves the problems existent in the field of sewage secondary treatment.

While only one embodiment of the invention has been shown, it is apparent that any number of distributor arms may be suspended from the rotating support without departing from the scope of this invention. This invention is, therefore, not to be limited to the details described, but covers all variations and modifications falling within the spirit of the invention and the scope of the appended claim.

Having thus described the invention, what is claimed as new and desired to be covered by Letters Patent is:

In a trickling filter having an upright, tubular center column adapted to receive sewage for treatment, an annular, open top sump having an outer wall and an inner wall circumscribing the center column in spaced relationship thereto; a number of short, radially extending pipe sections on said column for discharging sewage therefrom; an L-shaped, tubular branch for each pipe section; means releasably coupling one leg of each branch to a pipe section with the other leg thereof extending downwardly between said walls, said inner wall having a diameter sufficient to clear said pipe sections when the branches are removed therefrom; at least one, short pipe section extending radially from said outer wall adjacent the lowermost end thereof; an elongated distributor arm extending radially from the last-mentioned pipe section; means releasably coupling the arm at the innermost end thereof to said last-mentioned pipe section; rotatable structure on said column at the uppermost end thereof for mounting the sump and the arm in suspension; and a plurality of spaced, radially and inwardly extending guide rollers mounted on the sump therebeneath, there being an annular guide plate fixed to said column beneath the sump and presenting at its periphery a bearing surface for said rollers, said inner wall being of greater height than the outer wall whereby any excess of sewage overflows the latter rather than the former.

References Cited in the file of this patent

UNITED STATES PATENTS

| | | |
|---|---|---|
| 2,355,760 | Trebler | Aug. 15, 1944 |
| 2,588,475 | Bolton | Mar. 11, 1952 |
| 2,727,785 | Kelly | Dec. 20, 1955 |

FOREIGN PATENTS

| | | |
|---|---|---|
| 7,412 | Great Britain | 1903 |
| 8,595 | Great Britain | 1907 |
| 24,948 | Great Britain | 1908 |
| 27,227 | Great Britain | 1910 |
| 424,537 | France | May 16, 1911 |
| 227,135 | France | Aug. 16, 1943 |